(12) United States Patent
Chassiboud

(10) Patent No.: US 12,405,100 B2
(45) Date of Patent: Sep. 2, 2025

(54) TEMPLATE AND USE OF A TEMPLATE

(71) Applicant: DEERE & COMPANY, Moline, IL (US)

(72) Inventor: Jean-Loup Chassiboud, Esmoulins (FR)

(73) Assignee: Deere & Company, Moline, IL (US)

( * ) Notice: Subject to any disclaimer, the term of this patent is extended or adjusted under 35 U.S.C. 154(b) by 559 days.

(21) Appl. No.: 17/821,205

(22) Filed: Aug. 22, 2022

(65) Prior Publication Data

US 2023/0109634 A1 Apr. 6, 2023

(30) Foreign Application Priority Data

Oct. 4, 2021 (DE) .......................... 102021125625.9
Oct. 4, 2021 (EM) .................................. 008715783

(51) Int. Cl.
*G01B 5/30* (2006.01)
(52) U.S. Cl.
CPC ....................................... *G01B 5/30* (2013.01)
(58) Field of Classification Search
CPC .................................... G01B 5/30; G01B 3/02
USPC ........................................ 33/751, 562, 679.1
See application file for complete search history.

(56) References Cited

U.S. PATENT DOCUMENTS

2018/0215089 A1* 8/2018 Ohrn .................. A01F 15/0715

FOREIGN PATENT DOCUMENTS

| CN | 205844059 U | * 12/2016 | ............... G01N 1/28 |
| GB | 2525139 A | * 10/2015 | ............. B23B 47/28 |
| GB | 2525139 A1 | 10/2015 | |
| KR | 101149503 | * 5/2012 | ............... B21K 1/06 |
| KR | 101149503 B1 | 5/2012 | |
| KR | 20110064975 A | * 5/2012 | ............... B21K 1/06 |

OTHER PUBLICATIONS https://constructionmanuals.tpub.com/14251/css/Figure-3-56-Template-for-true-Y-branches-and-main-of-equal-diameter-108.htm (Year: 2019).*
Extended European Search Report and Written Opinion issued in European Patent Application No. 22195243.5, dated Mar. 3, 2023, in 06 pages.

* cited by examiner

*Primary Examiner* — Kristina M Deherrera
*Assistant Examiner* — Gilbert Bernard Shuster

(57) ABSTRACT

A template for determining a stretching ratio of a film sample of a film spanning a round bale includes a template body which has a supporting side and an oppositely arranged working side. The template body includes an outline edge defining a perimeter of a film sample. Two slots are formed in the template body for applying markings to the film, the two slots being arranged parallel to each other at a first distance. A contact marking is arranged on the working side of the template body. A scale for displaying the stretching ratio of the film sample is arranged on the working side at a predetermined distance from the contact marking.

9 Claims, 5 Drawing Sheets

TEMPLATE AND USE OF A TEMPLATE

CROSS-REFERENCE TO RELATED APPLICATIONS

This application claims the benefit of German Patent Application DE 102021125625.9 filed on Oct. 4, 2021, and EM 008715783 filed on Oct. 4, 2021, the disclosures of which are hereby incorporated by reference.

TECHNICAL FIELD

The disclosure generally relates to a template for determining a stretch ratio of a film wrapped around a round bale, and a method of determining a stretch ratio of a film.

BACKGROUND

A round baler can form harvest materials into a round bale and wrap the shaped round bale with a wrap material, e.g., a net, a film, or a sheet. It is desirable to wrap the round bale in such a way that the properties of the round bale are preserved and to prevent the round bale from expanding into an undesirable shape, size and density. A round bale wrapped too loosely not only leads to a lower quality of the round bale, but is also susceptible to the film getting stuck when picking up and transporting. However, due to the elastic properties of the wrap material, it is often difficult to wrap a round bale tightly. For example, if the tensile and compressive forces of the wrap material enveloping the round bale are less than the expansion forces of the formed round bale, the bale may expand after wrapping.

Different types of wrap materials may have different elastic properties. In addition, the elastic properties, for example the stretching ratio and/or the elasticity of the wrap material, may depend on the temperature and/or humidity of the crop material, the round baler used to form the bale, the expansion properties of the processed crop material, and/or the wrap material used. The disadvantage is therefore that the elastic properties of the film can change, in particular during the operation of the round baler.

Typically, the wrap material is applied with a constant tension of the wrap material. The constant tension may lead to feeding problems due to variabilities of the wrap material and the bale. The constant tension is often based on static and/or given elastic properties of the wrap material, which do not take into effect the actual elastic properties of the wrap material in the field and the influence of the various crops thereon. As a result, the wrap material can be damaged during the wrapping process.

SUMMARY

According to the disclosure, a template for determining a stretching ratio of a wrap material sample of a wrap material spanning a round bale is proposed. The template comprises a template body which has a supporting side and an oppositely arranged working side or display side, and an outline edge of the template body for measuring or defining a circumference or perimeter, in particular an outline and/or a size, of the wrap material sample. Furthermore, the template comprises two slots, preferably recesses, particularly preferably linear recesses, formed in the template body, for applying markings, preferably two markings, particularly preferably precisely two markings, to the wrap material. The two slots are arranged parallel to each other at a first distance. The template, in particular the template body, comprises a contact marking arranged on, in particular applied to, the working side of the template body. In addition, a scale for displaying the stretching ratio of the wrap material sample is arranged on, in particular applied to, the working side at a predetermined distance from the contact marking.

The template body, in particular also basic body, of the template can have a plate-like geometry. The template body can be rectangular or square. The template body can also be flat and/or generally two-dimensional. During use of the template, the supporting side can be placed onto the round bale spanned by the wrap material, in order to mark the wrap material and to remove a wrap material sample. The supporting side and the working or display side can be two parallel surfaces which can be formed on respectively oppositely arranged sides of the template body. The slots formed in the template body can be linear. The slots can be designed as recesses, in particular can be designed as linear openings or recesses from the supporting side to the working side. When the template lies against the wrap material, markings, in particular two markings, can be applied, for example with a pen, to the wrap material tensioned around the round bale, in particular to the wrap material sample that is to be removed. The two slots can be arranged parallel to each other at a first distance. The first distance can be a predetermined distance, in particular a fixedly predetermined distance, between the two markings on the wrap material or the wrap material sample in the tensioned state. The first distance can be 15 to 25 cm, preferably 18 to 22 cm, particularly preferably 20 cm.

If, during use of the template, the supporting side rests on the round bale spanned by the wrap material, the size and/or the outline of the wrap material sample can be measurable and/or removable with the outline edge of the template body. For this purpose, the wrap material can be severed along the outline edge of the template body in order to remove the wrap material sample. The wrap material sample can subsequently be removed.

The contact marking and scale can be applied to the working side, in particular engraved or imprinted thereon. The scale can comprise one or more graduation marks at which the stretching ratio is determinable, in particular readable. In addition, the contact marking can lie along an extended straight line with one of the two slots. In order to be able to apply the wrap material sample at the designated point on the template, the two markings on the wrap material sample can be applied to the contact marking and scale in a simple manner. For this purpose, by simple visual monitoring, one of the two markings can be brought to coincide with the contact marking or applied to the contact marking in the direction of an extension or an extended straight line thereof. The other of the two markings can be brought, by simple visual monitoring, to coincide with one of the graduation marks of the scale or applied to said graduation marks in the direction of an extension of one of the graduation marks of the scale. This facilitates the positioning and the reading of the wrap material sample. The scale can be arranged at a predetermined distance from the contact marking. Similarly, each of the graduation marks of the scale can be assigned a distance, in particular an increasing or decreasing distance, from the contact marking. With reference to the distance assigned to the respective graduation mark from the contact marking, a second distance of the two markings of the wrap material sample or wrap material can be determinable in the relaxed state. In the relaxed state of the wrap material, the two markings are therefore at the second distance. By applying the wrap material sample in the relaxed state, the stretching ratio can be determinable, in particular directly readable, in particular using the first and second distance of the two markings, in particular using values and/or units of the stretching ratio arranged on the scale. The values and/or units can preferably be arranged on the scale on the working side of the template body, preferably engraved or imprinted thereon.

Specifically, the stretching ratio can therefore be determinable from a ratio of the first distance, i.e. the distance between the two markings of the tensioned wrap material or wrap material sample, to the second distance, i.e. the distance between the two markings of the relaxed wrap material sample. As a result, the stretching ratio can be readable directly at each graduation mark. Specifically, the stretching ratio is produced as a percentage, as follows:

$$S = \frac{d_1 - d_2}{d_2} \times 100$$

wherein S=stretching ratio, $d_1$=first distance, and $d_2$=second distance.

In other words, the template can be configured in such a manner that the template is applicable with the application side to the wrap material spanning the round bale, and the tensioned wrap material with the two slots, in particular a first and second recess, is markable with two markings, in particular a first and second reference line. The wrap material is therefore markable in the tensioned state with the first reference line via or by means of the first recess and with the second reference line via or by means of the second recess. The second recess can be parallel to the first recess. In addition, the first and second recess are at the first distance, in particular a first predetermined distance. The outline or the outer contour of the template body can be configured here as a guide aid for defining the circumference or perimeter and/or the size of the wrap material sample and for removing the wrap material sample in the tensioned state when the supporting side rests on the wrap material. The graduation marks of the scale can be arranged at regular distances in one dimension. In addition, the graduation marks can be parallel to the first recess. In the relaxed state, i.e. in particular after the removal and after a relaxation period, the wrap material sample can be positioned with the first reference line to the contact marking and with the second reference line to the scale for determination, in particular for reading and/or detection, preferably to one of the graduation marks of the scale, in such a manner that a stretching ratio of the wrap material sample is determinable, in particular directly readable, with the scale. In the relaxed state of the wrap material, the first and second reference lines are at a second distance. The stretching ratio of the wrap material sample can therefore be determinable (see the formula above). The stretching ratio can be determinable, in particular directly readable, in particular with the values and/or units of the stretching ratio arranged on the scale.

The stretching ratio or the elasticity of the wrap material may thus be determinable in a simple manner with the template. Advantageously, the operation of the round baler and the wrapping of the round bales can thereby be improved by the tension with which the wrap material is applied to the round bale being adjustable at the round baler.

In one aspect of the disclosure, the scale may include one or more graduation marks. The graduation mark or the graduation marks of the scale is or are arranged parallel to the contact marking, and/or the scale is divided linearly. In the relaxed state of the wrap material sample, the two markings are at a second distance and are applicable to the contact marking and to a graduation mark of the scale in such a manner that the stretching ratio of the wrap material sample is ascertainable, in particular readable. Each graduation mark can be at a predetermined distance, preferably a second distance, particularly preferably a predetermined second distance, from the contact marking. The stretching ratio of the wrap material sample or of the wrap material can be determined with the ratio of the first distance and the distance, which is determinable upon application of the wrap material sample in the relaxed state, of the two markings between the graduation mark and the contact marking. Advantageously, further aids and measurements can thus be dispensed with and the stretching ratio can be determinable in a simple manner.

In another aspect of the disclosure, the graduation marks of the scale may include values and/or a unit. The graduation marks can therefore be labeled with values and/or the unit. The values and/or unit can be imprinted onto the template body or engraved in the template body. The values of the stretching ratio can be between 5 and 50%, preferably between 10 and 40%, particularly preferably between 10 and 39%. The unit of the stretching ratio can be indicated in percent.

In one aspect of the disclosure, a operating instruction for using the template is disposed on the working side, preferably applied thereto, particularly preferably engraved in the template body or imprinted onto the template body. In a structurally advantageous exemplary embodiment, the template is configured as a single piece. The working instruction can include the working steps for determining the stretching ratio in pictorial form and/or as text. The manner of working with the template and/or the use or the operation of the template is thereby advantageously simplified.

In one aspect of the disclosure, one of the slots and the contact marking lie on a straight line. Specifically, the first recess and the contact marking can lie on a straight line, i.e., a joint straight line. Advantageously, the template can thus be configured structurally simply since the stretching ratio can thereby be determined in a simple manner.

In one aspect of the disclosure, the template body is formed from paper, preferably paper with a high weight, particularly preferably paper with a weight greater than 100 g/qm, and/or plastic and/or metal and/or any strong material.

The template body can also include a transparent wrap material. Advantageously, the rapid wear of the template during daily use can thereby be reduced.

The template may be used for determining the stretching ratio of the sample of the wrap material spanning the round bale. The use is undertaken as follows. The template is placed onto a region of the wrap material, in particular in the circumferential direction of the wrap material on the round bale. The markings, in particular the precisely two markings, are applied along the slots to the wrap material. The wrap material can be marked here, for example, with a pen or marker via or through the slots. The wrap material is severed along the outline edge of the template body for removal of the wrap material sample and the wrap material sample is removed. A cutting element, for example a blade, can be used for the severing. The cutting element can be guided along the outline edge to cut the wrap material, the outline edge being able to be used as a guide aid. The removed wrap material sample is subjected to a relaxation period. The relaxation period can have a time interval of preferably 30 seconds to 10 minutes, particularly preferably 1 minute to 5 minutes, especially 3 minutes. In particular after the relaxation period, the wrap material sample with the two markings is applied to the contact marking and scale of the template to ascertain, in particular determine and/or read, the stretching ratio. For this purpose, one of the two markings can be applied to the contact marking. The other of the two markings can be applied to a graduation mark of the scale and the stretching ratio determined.

the above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3A to FIG. 3E show a schematic illustration of the first exemplary embodiment of the template and the use thereof according to the disclosure.

DETAILED DESCRIPTION

Figure 1A:
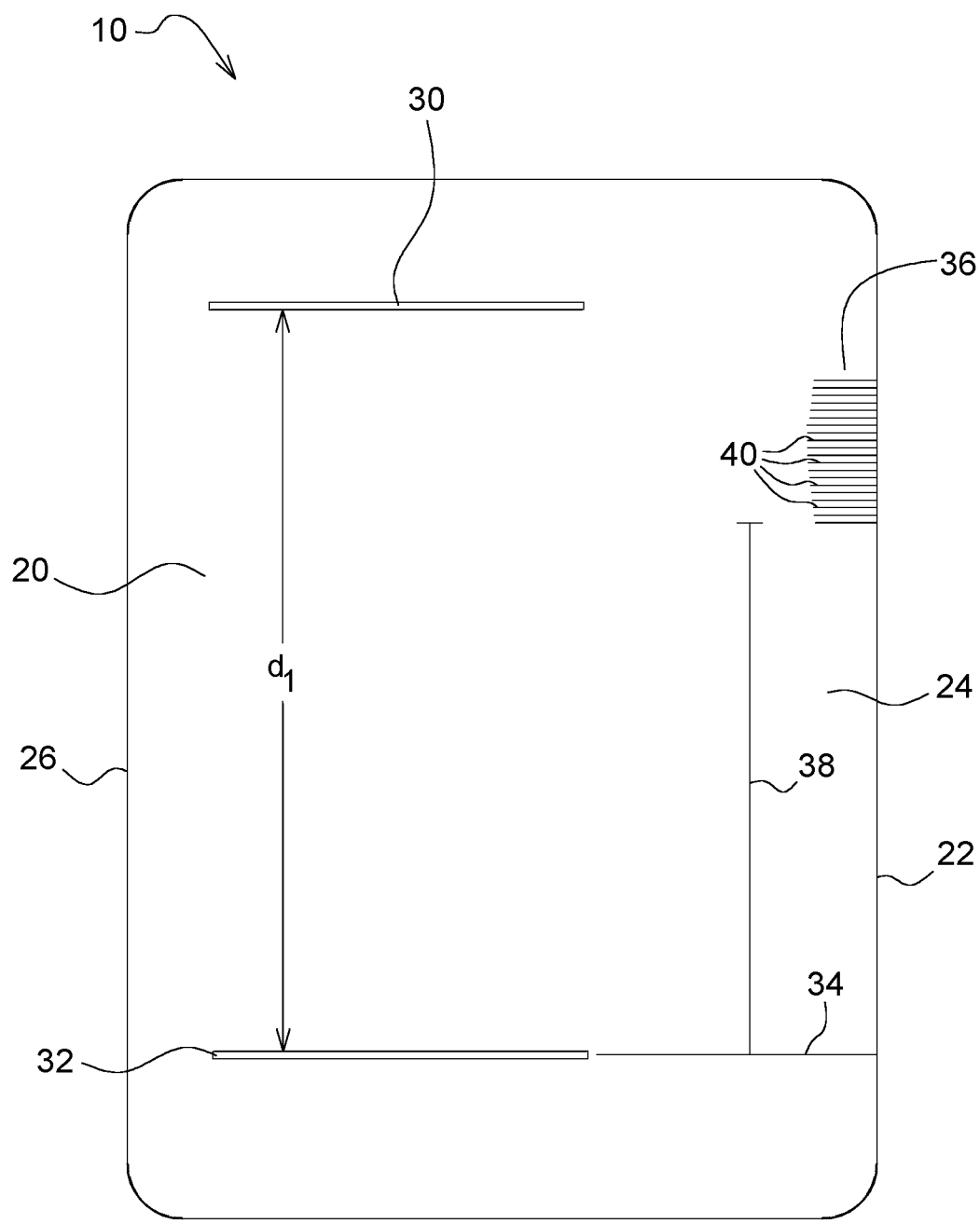
FIG. 1A shows a schematic illustration of a first exemplary embodiment of a template according to the disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a schematic illustration of a first exemplary embodiment of a template is generally shown at 10. The template 10 may be used for determining a stretching ratio of a sample of a wrap material, hereinafter referred to as a film sample (see FIG. 1B, reference sign 54) spanning a round bale (see FIG. 3B, reference sign 110). The template 10 includes a template body 20 which has a supporting side 22 and an oppositely arranged working side 24. The template 10, in particular the template body 20, is formed as a single piece. Furthermore, an outline edge 26 of the template body 20 is provided for measuring or defining a circumference or perimeter of the film sample 54. Two slots 30, 32, i.e., a first and second recess, in particular two linear recesses, are formed in the template body 20 for applying markings, in particular two markings 50, 52, to the film 112 or the film sample 54, the two slots 30, 32 being arranged parallel to each other at a first distance $d_1$. A contact marking 34 is arranged on the working side 24 of the template body 20. One of the slots 32 and the contact marking 34 can lie on a joint straight line. Similarly, a scale 36 for displaying the stretching ratio of the film sample 54 is arranged, in particular positioned, on the working side 24 of the template body 20 at a predetermined distance 38 from the contact marking 34. The scale 36 comprises one or more graduation marks 40. The graduation marks 40 are all arranged parallel to the contact marking 34. In addition, the scale 36 is divided linearly, i.e., the graduation marks 40 are arranged at an equal distance from one another. The distance 38 from the contact marking 34 can increase by the same distance for each next graduation mark from the graduation mark closest to the contact marking 34.

Figure 1B:
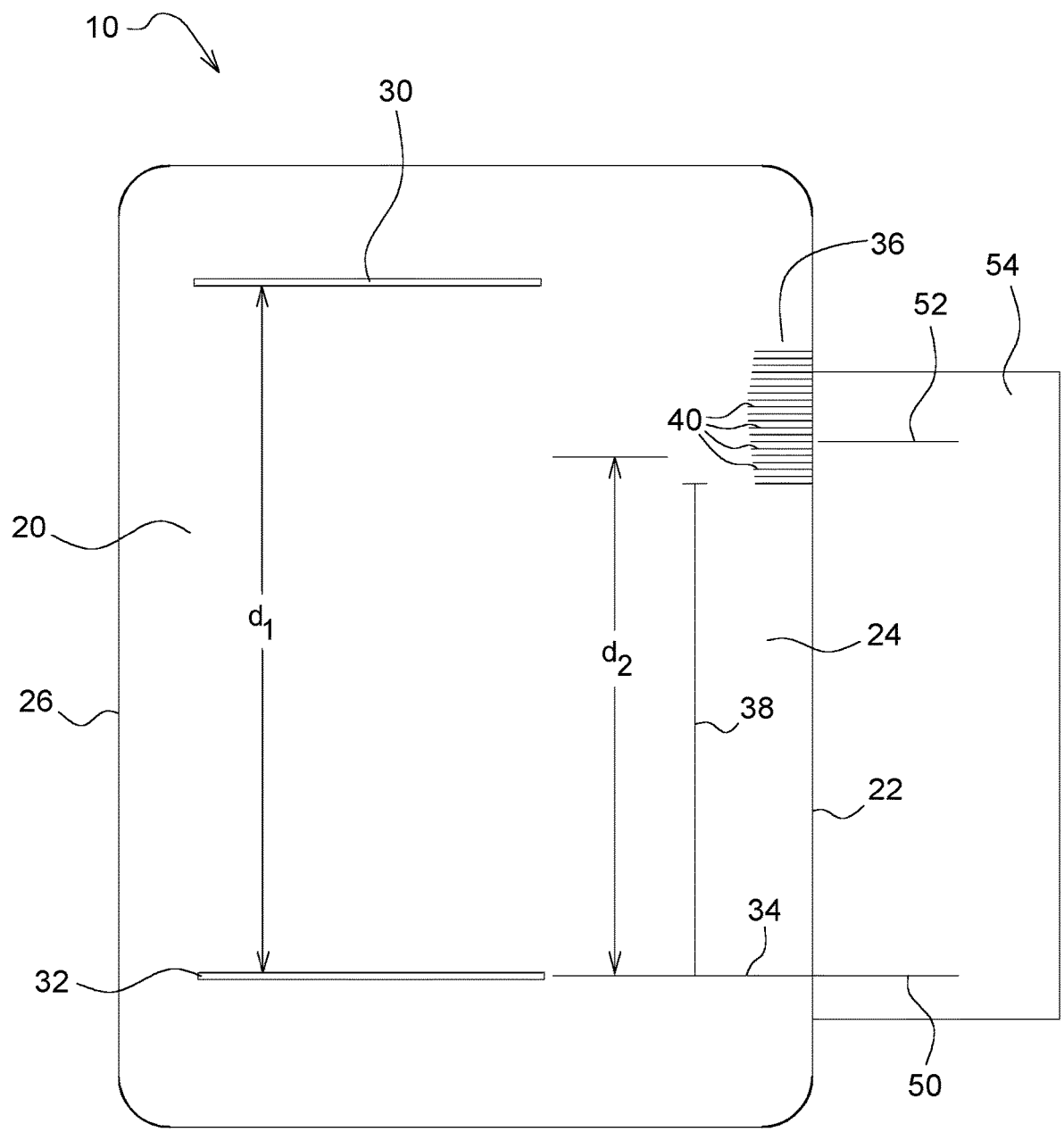
FIG. 1B shows a schematic illustration of the first exemplary embodiment of the template according to the disclosure with an applied film sample.

FIG. 1B shows a further schematic illustration of the first exemplary embodiment of the template 10 according to the disclosure with an applied film sample 54. The template 10 shown in FIG. 1b corresponds substantially to the template 10 shown in FIG. 1A, and therefore only details and/or points of differentiation will be discussed below. The markings 50, 52 of the film sample 54, in particular on the film sample 54, can be applicable at a second distance $d_2$ to the contact marking 34 and a graduation mark 40 of the scale 36 in such a manner that the stretching ratio of the film sample 54 is ascertainable, in particular readable.

Figure 2:
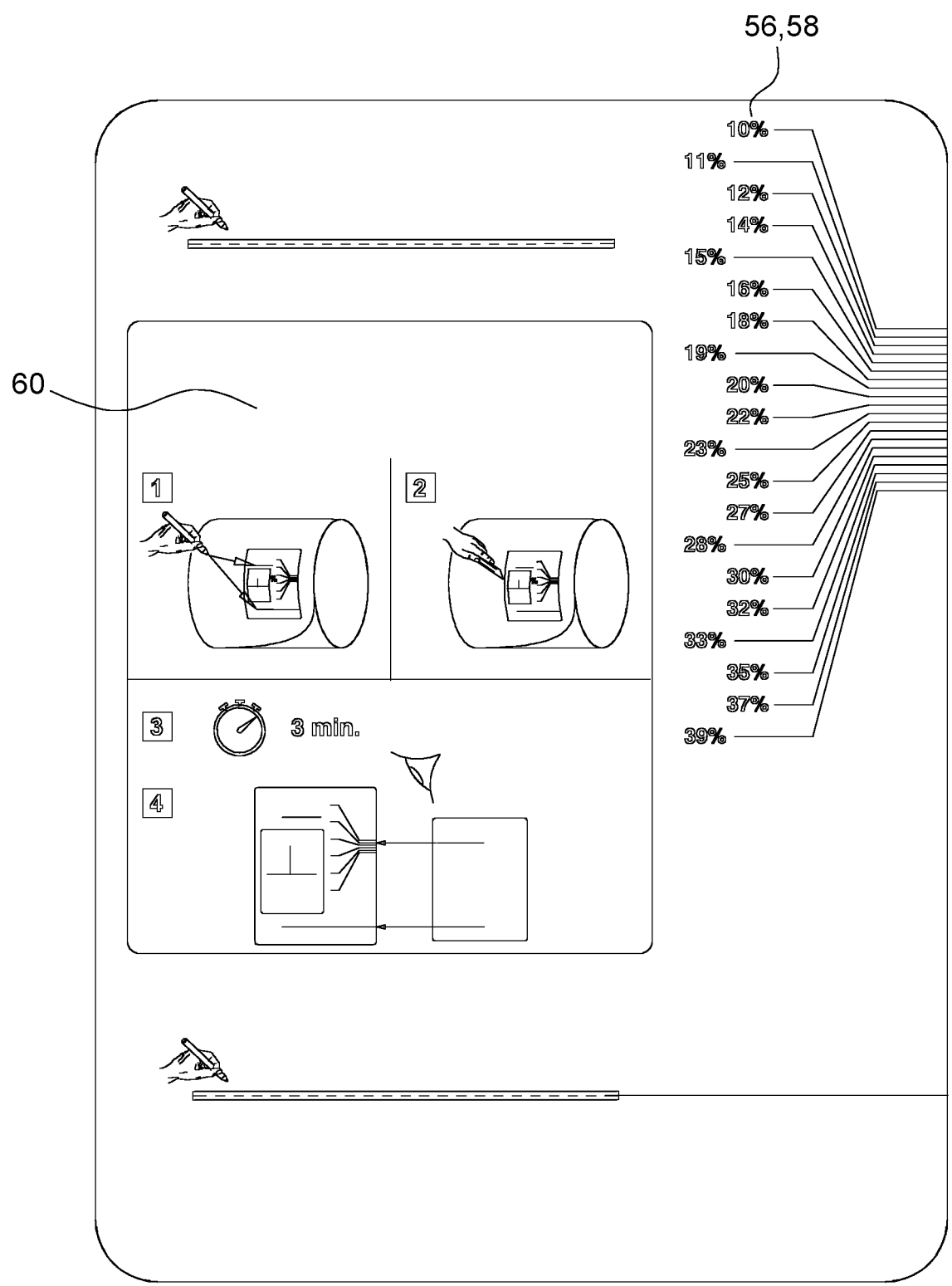
FIG. 2 shows a schematic illustration of a second exemplary embodiment of a template according to the disclosure.

FIG. 2 shows a schematic illustration of a second exemplary embodiment of the template 10 according to the invention. The template 10 shown in FIG. 2 corresponds substantially to the template 10 shown in FIG. 1, and therefore only details and/or points of differentiation will be discussed below. The graduation marks 40 of the scale 36 have values 56 and/or a unit 58. The values 56 correspond to the stretching ratio and the unit is a value indicated as a percentage. Furthermore, a working instruction 60 for using the template 10 is disposed on the working side 24.

Figure 3A:
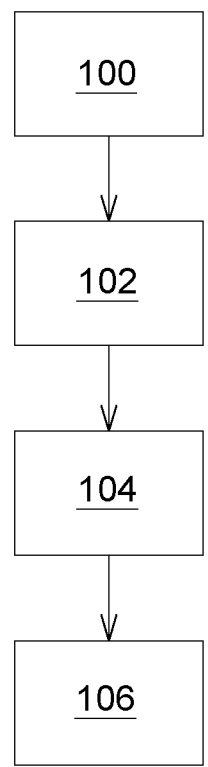
Figure 3D:
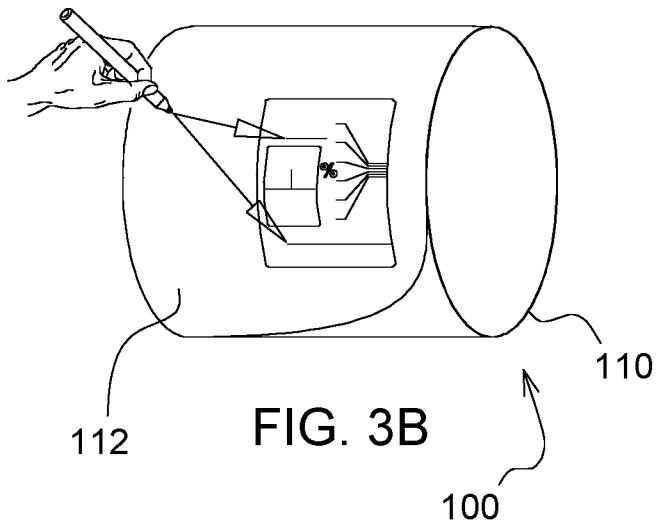
Figure 3D:
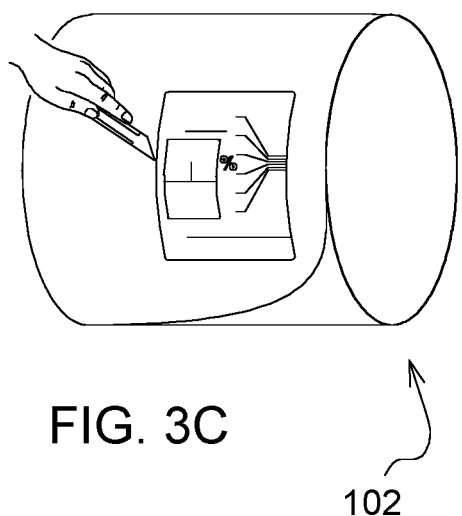
Figure 3D:
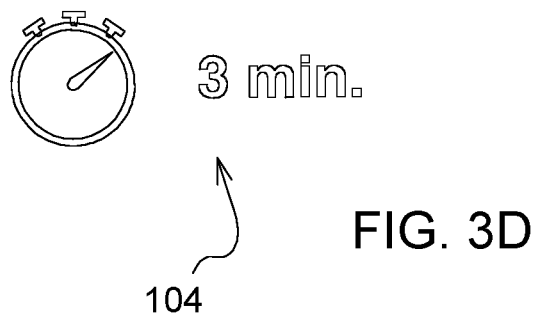
Figure 3E:
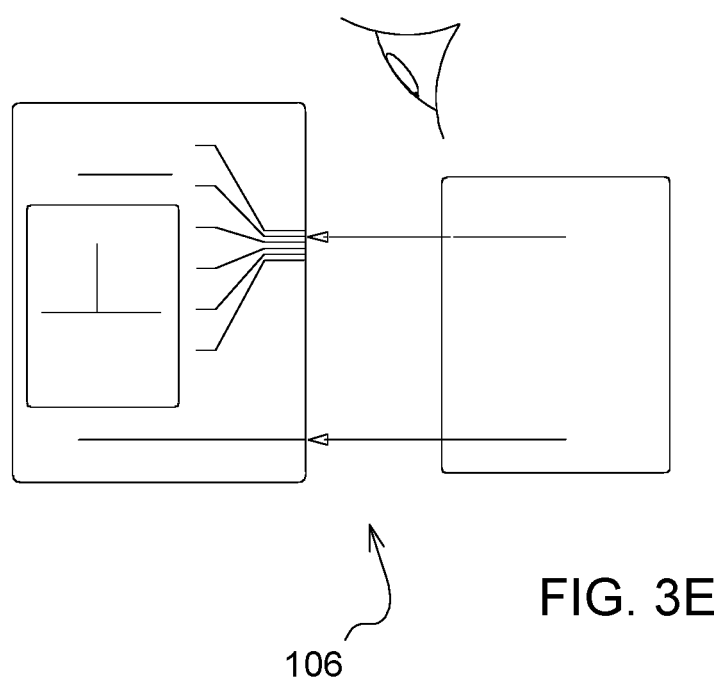

FIGS. 3A to 3E show schematic illustrations of a first exemplary embodiment of the use according to the disclosure of the template 10 for determining a stretching ratio of a film sample 54 of a film 112 spanning a round bale. The template 10 shown in FIGS. 3A to 3E corresponds substantially to the template 10 shown in FIGS. 1A, 1B and 2, and therefore only details and/or points of differentiation will be discussed below. FIG. 3A shows the entire sequence of the use, and FIGS. 3B to 3E the individual steps of the use. FIG. 3A shows a schematic illustration, in particular a sequence, of a first exemplary embodiment of the use according to the invention of the template 10. In a first step 100 (also see FIG. 3B), the template 10 is placed onto the film 112 spanning the round bale, in particular with the supporting side 22 on the film 112. The template 10 is preferably placed in the circumferential direction of the film 112 spanning the round bale. Along and through the slots 30, 32, two markings 50, 52 are applied to the film 112 (see FIG. 3B, reference sign 110). For this purpose, the film 112 can be marked through or via the two slots 30, 32 with a pen or a marking device suitable in some other way. The template 10 can subsequently remain with the supporting side 22 on the film 112. In a second step 102 (also see FIG. 3C), in order to remove the film sample 54, the film 112 is severed along the outline edge 26 of the template body 20 and the film sample 54 is removed. The first and second step 100, 102, marking and removal of the film sample 54, can optionally also be carried out in reverse or simultaneously. After the film sample 54 has been removed, the removed film sample 54 is exposed to a relaxation period in a third step 104 (also see FIG. 3D). The relaxation period can have a time interval of preferably 30 seconds to 10 minutes, particularly preferably 1 minute to 5 minutes, especially 3 minutes. In a fourth step 106 (also see FIG. 3E), the film sample 54 is applied with the markings to the contact marking 34 and scale 36, in particular one of the graduation marks 40, for ascertaining, i.e. in particular reading, the stretching ratio.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A template for determining a stretching ratio of a film sample of a film spanning a round bale, the template comprising:
   a template body having a supporting side and an oppositely arranged working side;
   the template body including an edge defining a perimeter of the template body;
   two slots formed in the template body, wherein the two slots are arranged parallel to each other and separated by a first distance;
   a contact marking arranged on the working side of the template body; and
   a scale, which is arranged on the working side at a predetermined distance from the contact marking, wherein the scale is configured to indicate the stretching ratio of the film sample after the film sample has been removed from the round bale and allowed to relax for a relaxation period.

2. The template set forth in claim 1, wherein the scale includes at least one graduation mark arranged parallel to the contact marking.

3. The template set forth in claim 1, wherein the scale is divided linearly via a plurality of graduation marks.

4. The template set forth in claim 1, wherein the scale includes at least one graduation mark having a value associated therewith.

5. The template set forth in claim 1, further comprising a working instruction for using the template disposed on the working side of the template body.

6. The template set forth in claim 1, wherein the template is configured as a single piece.

7. The template set forth in claim 1, wherein one of the slots and the contact marking lie on a straight line.

8. The template set forth in claim 1, wherein the template body is formed from one of a paper, a plastic, or a metal.

9. A method of determining a stretch ratio of a film sample of a film spanning a round bale, the method comprising:
   positioning a template onto a region of the film spanning the round bale and under tension, wherein the template includes a first slot and a second slot arranged in parallel and spaced a first distance from each other, and includes an edge defining a film sample;
   marking the film through the first slot to define a first marking on the film sample;
   marking the film through the second slot to define a second marking on the film sample;
   severing the film sample from the film spanning the round bale, around an edge of the template body;
   relaxing the film sample for a relaxation period;
   positioning the film sample on the template with one of the first marking and the second marking aligned with a contact marking disposed on the template body; and
   referencing the other of the first marking and the second marking to a scale disposed on the template body, whereby the scale indicates the stretch ratio.

* * * * *